US012769601B2

(12) United States Patent
Wang et al.

(10) Patent No.: US 12,769,601 B2
(45) Date of Patent: Oct. 20, 2026

(54) HOST-FACING DMA FAILURE DETECTION FOR TRANSPORT OFFLOAD WITH MULTI-STAGE QUEUE OPERATIONS

(71) Applicant: Advanced Micro Devices, Inc., Santa Clara, CA (US)

(72) Inventors: Xuyang Wang, Santa Clara, CA (US); Vishwas Danivas, Santa Clara, CA (US); Sanjay Shanbhogue, Santa Clara, CA (US); Murty Subbaramachandra Kotha, Santa Clara, CA (US); Mehul Jitendrabhai Vora, Hyderabad (IN); Rohit Kailash Sharma, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 18 days.

(21) Appl. No.: 18/758,279

(22) Filed: Jun. 28, 2024

(65) Prior Publication Data

US 2026/0003713 A1 Jan. 1, 2026

(51) Int. Cl.
*G06F 11/00* (2006.01)
*G06F 11/07* (2006.01)

(52) U.S. Cl.
CPC ...... *G06F 11/0772* (2013.01); *G06F 11/0793* (2013.01)

(58) Field of Classification Search
CPC .......................... G06F 11/0772; G06F 11/0793
USPC ........................................................ 714/1-57
See application file for complete search history.

(56) References Cited

U.S. PATENT DOCUMENTS 11,119,787 B1 * 9/2021 El-Shabani ........... G06F 9/3856
2002/0009075 A1 * 1/2002 Fesas, Jr. .......... H04L 12/40006 370/363
2004/0243738 A1 * 12/2004 Day ........................ G06F 13/28 710/22
2006/0143509 A1 * 6/2006 Okawa ................ G06F 11/1052 714/E11.144
2009/0300629 A1 * 12/2009 Navon .................. G06F 9/4881 718/102
2016/0342545 A1 * 11/2016 Arai .................... G06F 11/0727
2021/0073151 A1 * 3/2021 Sen ..................... H04L 12/1868
2023/0418746 A1 * 12/2023 Kahalon ................. G06F 9/461
2024/0370303 A1 * 11/2024 Cao ....................... G06F 9/5044
2025/0077339 A1 * 3/2025 Kamazuka .......... G06F 11/0721

* cited by examiner

*Primary Examiner* — Sarai E Butler
(74) *Attorney, Agent, or Firm* — Patterson + Sheridan, LLP

(57) ABSTRACT

Embodiments herein describe including one or more error indicating bits in a task pointer (e.g., a WQE) to tell a downstream queue or stage, such as a pipeline, that an upstream queue or stage detected a DMA error. The communication from each upstream stage or pipeline to the next is typically through posting WQEs into the next stage queue and ringing doorbells. The embodiments herein use one or more error indicator bits (e.g., color bits) in the WQE to inform a downstream queue (e.g., a downstream pipeline) that the upstream queue/pipeline detected a failed DMA operation. The downstream queue can then perform error handling where it reclaims the resources allocated for the WQE (such as an intermediate buffer).

20 Claims, 5 Drawing Sheets

HOST-FACING DMA FAILURE DETECTION FOR TRANSPORT OFFLOAD WITH MULTI-STAGE QUEUE OPERATIONS

TECHNICAL FIELD

The embodiments presented herein relate to using error indicators in task pointers between queues or pipelines.

BACKGROUND

Network interface cards or controllers (NICs) that provide offload services for transport services such as nonvolatile memory express (NVMe) over fabric may resort to an implementation of multi-stage service queue operations, with each stage performing a subset of the entire tasks. For example, a first stage implements fetching application work queue elements (WQE) from host, while a second stage prepares NVMe data payload and posts to a transmission control protocol (TCP) service queue for packetization and transfer service, and finally a third stage prepares and transfers the entire TCP or remote direct memory access (RDMA) packet and releases the resources that are used for serving a single application WQE.

SUMMARY

One embodiment described herein is a network device that includes a first pipeline including circuitry configured to generate a list of direct memory access (DMA) commands corresponding to a task, initialize, before performing the list of DMA commands, an error indicator in a task pointer to indicate that an error occurred when executing the list of DMA commands, and after executing the list of DMA commands by the first pipeline without detecting an error, update the error indicator to indicate there was no error corresponding to the list of DMA commands. The network device includes a second pipeline including circuitry configured to receive the task pointer and packetize data retrieved by the first pipeline when executing the list of DMA commands.

Another embodiment is a method that includes generating, in a first pipeline, a list of direct memory access (DMA) commands, initializing, before performing the list of DMA commands, an error indicator in a task pointer to indicate an error corresponding to the DMA commands, after executing the DMA commands in the first pipeline without detecting an error, updating the error indicator to indicate there was no error corresponding to the DMA commands, and transmitting the task pointer to a second pipeline.

Another embodiment is a NIC that includes a first queue including circuitry configured to generate a list of DMA commands corresponding to a task, initialize, before performing the list of DMA commands, an error indicator in a task pointer to indicate that an error occurred when executing the list of DMA commands, after executing the list of DMA commands by the first queue without detecting an error, updating the error indicator to indicate there was no error corresponding to the list of DMA commands. The NIC includes a second queue that includes circuitry configured to receive the task pointer and packetize data retrieved by the first queue when executing the list of DMA commands.

DETAILED DESCRIPTION

Figure 1:
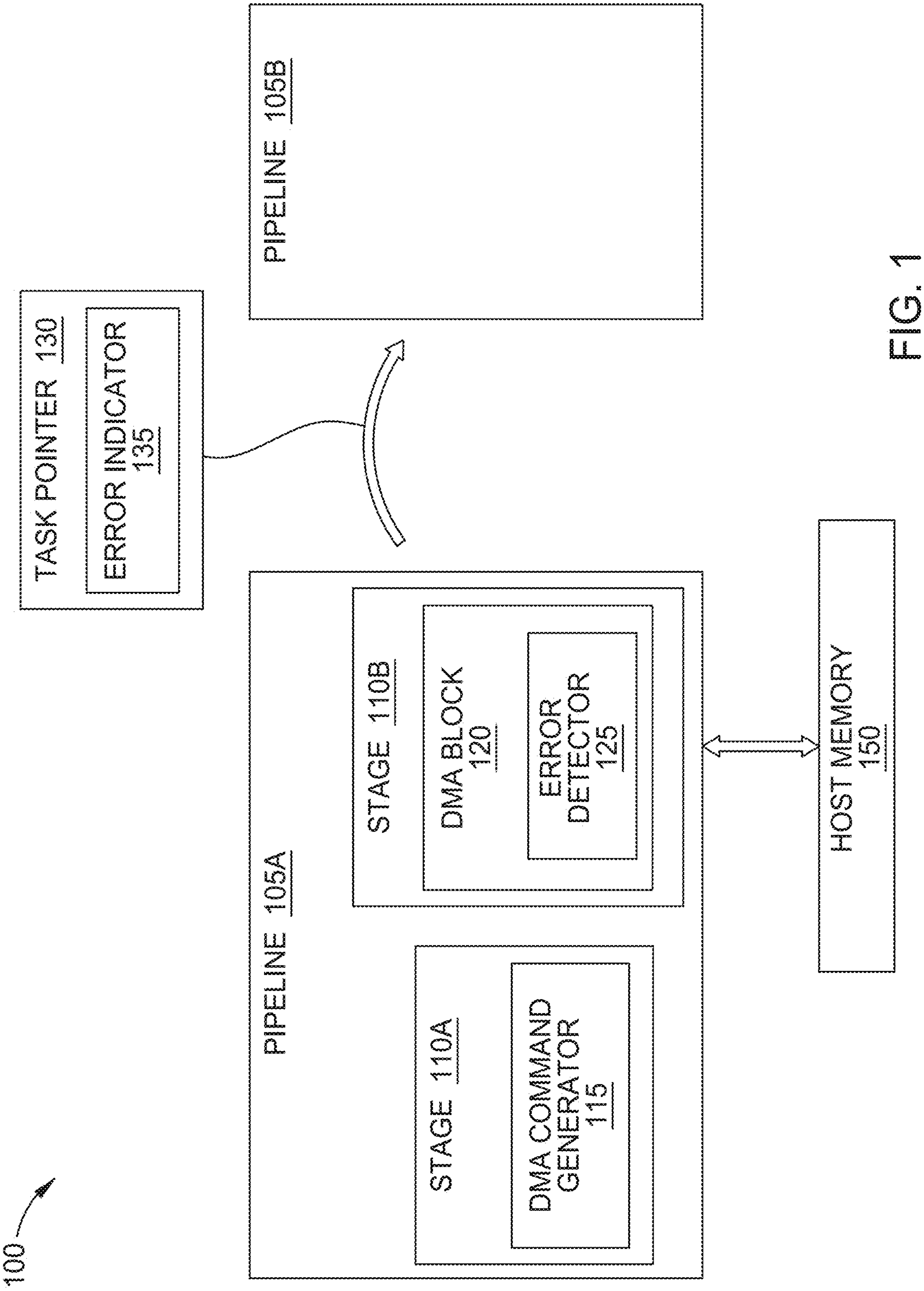
FIG. 1 illustrates a system with two pipelines for performing host-facing direct memory access (DMA) failure detection, according to one embodiment herein.

Embodiments herein describe including one or more error indicating bits in a task pointer (e.g., a WQE) to tell a downstream stage, such as a pipeline, that an upstream stage detected a DMA error. The communication from each upstream stage or pipeline to the next is typically through posting WQEs into the next stage queue and ringing doorbells. Processing an application WQE typically includes performing DMA operations to retrieve and store host data into NIC local memory, such as WQE content, NVMe Physical Region Pages (PRP) list, and potentially application data to be carried on NVMe protocol data units (PDUs). DMA error handling for NVMe PRP list and application payload can be challenging because processing a NVMe application WQE may include allocating internal resources such as local memory to cache PRP list and application data from host memory to prepare payload in NVMe PDUs. Since PDUs can range from 4K to 128K, or even larger sizes, these DMA operations and resource allocation are typically incremental, usually fetching a portion of application data each time from host memory. Any DMA error detected in the middle of the process should be gracefully handled to reclaim the resources already allocated. Moreover, for performance reasons, DMA error responses are not fed back synchronously to either firmware or an application specific integrated circuit (ASIC) block that initiates the DMA operation, which has the correct context to associate the failed DMA operations to the allocated resources. This makes resource reclamation difficult in an out-of-context scenario.

The embodiments herein use one or more error indicator bits (e.g., color bits) in the task pointer (e.g., a WQE) to inform a downstream queue (e.g., a downstream pipeline) that the upstream queue/pipeline detected a failed DMA operation. The downstream queue can then perform error handling where it reclaims the resources allocated for the task pointer (such as an intermediate buffer). Advantageously, this system means that DMA error responses do not have to be fed back synchronously to firmware or software. Instead the queues or pipelines can perform the error handling, such as reclaiming the resource allocated for the task pointer.

In one embodiment, a network device (e.g., a NIC or a data processing unit (DPU)) detects a host-facing DMA error asynchronously in a multi-stage (or multi-pipeline) service queue architecture. In this architecture, the communications between upstream and downstream queues may be through DMA commands, while fetching or sending data from/to host are also through DMA commands. The upstream queue processes a task pointer, and eventually schedules DMAs to post task pointers to the next stage queue to pick up work.

Meanwhile, additional host-facing DMAs are scheduled to either provide available data for the next stage queue or transfer data into the host. By carefully arranging the positions of these DMA commands and providing an additional error indicating bit in the task pointer, the system ensures that the appropriate error indicating bit value is in the task pointer and is presented to the next stage queue if any of the host-facing DMAs fails. This triggers the next stage queue or pipeline to begin an error handling process, which can include freeing up resources that were allocated to the task associated with the task pointer.

FIG. 1 illustrates a system 100 with two pipelines 105 for performing host-facing DMA failure detection, according to one embodiment herein. While the embodiments herein are discussed in the context of NVMe, they are not limited to such. For example, the pipelines 105 may be part of any process where multiple pipelines are used to complete a task, such as generating and transmitting a packet, updating a remote memory, or other transport services. For instance, the pipelines 105 may be part of a network device (e.g., DPU or a NIC) that offload transport services from the host.

The pipelines 105 are examples of multi-stage queues that work together to perform a transport service. In this example, the pipeline 105A includes stage 110A and stage 110B, but can have more than these stages. The stage 110A includes a DMA command generator 115 that generates commands that are then performed by a DMA block 120 (e.g., a DMA engine circuit or circuitry) in the stage 110B. For instance, the DMA command generator 115 can generate a list of DMA commands that the DMA block 120 executes to pull data from host memory 150. For example, these DMA commands may retrieve data from the host memory 150 (e.g., at intervals) that is then stored in local memory in the pipeline 105A.

The DMA block 120 includes an error detector 125 for detecting an error that occurs when executing the DMA commands. Non-limiting examples of DMA errors (e.g., host-facing DMA errors) include host driver bugs that program wrong entries in the NVMe PRP list, a function level reset that results in input/output memory management unit (IOMMU) map entries programed for host pages becoming invalid, and a malicious host program obtaining kernel privileges and intentionally posting a WQE associated with wrong PRP list entry addresses. If host-facing DMA errors are not detected and handled correctly, they may cause failures such as internal resource leaks and eventually making services unavailable due to exhausted resources, NIC data path pipeline becoming stuck, silent data corruption, and service disruption to other virtual machines (VMs) on the host that are not the originator or recipient of the DMAs encountering errors.

If the error detector 125 detects an error when performing the DMA commands at stage 110B, the DMA block 120 can use an error indicator 135 (e.g., error indicator bit or bits) in a task pointer 130 to inform the next pipeline 105B (e.g., the next queue) that the previous pipeline 105A encountered a host-facing DMA error (which can be a DMA error both to and from the host). In one example, the task pointer 130 is a WQE, but this is just one example. The task pointer 130 can be any data structure that passes context of tasks from one pipeline or queue to a downstream pipeline or queue. In one embodiment, the task pointer 130 indicates the location of data that the first pipeline 105A prepared for the second pipeline 105B to process. For example, the task pointer 130 can point to the memory location where the DMA block 120 stored data retrieved from the host memory 150 when executing the DMA commands.

In addition, the embodiments herein also add the error indicator 135 to the task pointer which informs the pipeline 105B if there was the DMA error detected by the first pipeline 105A. For instance, one value of the error indicator 135 can mean there was no error when executing the DMA commands at stage 110B of the pipeline 105A while a second value of the error indicator 135 means there was an error when executing the DMA commands. In one embodiment, the pipelines 105A and 105B can be synchronized so they know which value of the error indicator 135 indicates there is an error and which value indicates there is not an error. This will be discussed in more detail in FIG. 3.

The pipeline 105B can receive (or retrieve) the task pointer 130. For example, the pipeline 105A may use a doorbell to inform the pipeline 105B (or a scheduler that schedules the pipelines 105) that the task pointer 130 is ready. The pipeline 105B can include one or more stages for processing data identified from the task pointer 130. For example, if the error indicator 135 indicates there was no error, the pipeline 105B may retrieve the data that was saved locally in the pipeline 105A, packetize the data (e.g., convert it into TCP or RDMA packets), and transmit the data.

However, if the error indicator 135 indicates there was a DMA error in the first pipeline 105A, the pipeline 105B can instead perform error handling, without having to rely on firmware or software. That is, rather than having to make software or firmware aware of the error, the hardware (e.g., the pipeline 105B) can perform error handling to avoid the failures mentioned above. This can improve performance and avoid having to feed back the error to the firmware or ASIC block that initiated the DMA operation. That is, the correct context of the failed DMA operation is provided to the downstream pipeline 105B so it can handle the error and perform resource reclamation. As such, the pipeline 105B can perform different tasks depending on the error indicator 135. For example, the stages in the pipeline 105B may operate differently depending on the value of the error indicator 135—e.g., perform packetization versus perform error handling.

Figure 2:
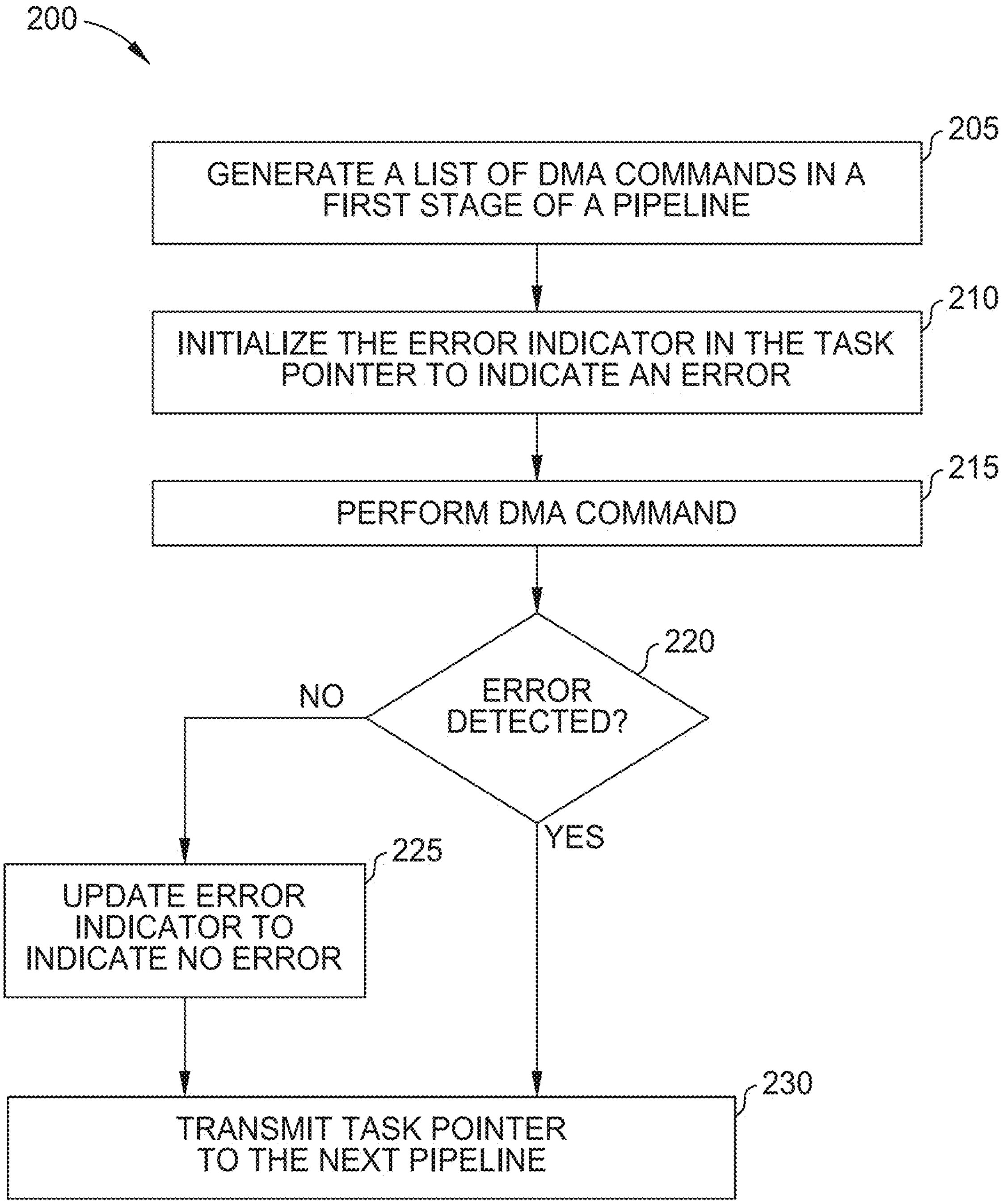
FIG. 2 is a flowchart for detecting host-facing DMA failures, according to one embodiment herein.

FIG. 2 is a flowchart of a method 200 for detecting host-facing DMA failures, according to one embodiment herein. At block 205, a first stage in a pipeline (or a queue) generates a list of DMA commands to be executed by a second (downstream) stage in the pipeline. In one embodiment, one of the DMA commands generated at block 205 initializes the error indicator in the task pointer (or WQE) to indicate there is an error. However, the list of DMA commands also includes a later DMA command (e.g., a DMA command at the end of the list), that instructs the second stage of the pipeline to change the error indicator in the task pointer to indicate there was not an error, assuming the list of DMA commands were executed successfully. This is described in the remaining blocks of the method 200.

In the context of NVMe, a NVMe command can be large (e.g., 64 kilobytes) and have a pointer that points to a PRP list. The DMA commands can be commands to read the PRP list from host memory to then perform follow-up DMA commands to retrieve the rest of the data associated with the NVMe command.

At block 210, the second stage in the pipeline receives the commands generated at the first stage in the pipeline and initializes the error indicator in the task pointer to indicate an error. That is, the default or initial state of the error indicator is a value that indicates there was an error when performing the DMA commands in the list generated at block 205, even though these DMA commands may not yet have been executed.

For instance, the first, or one of the first, of the DMA commands in the list may be for the DMA block in the second stage to initialize the error indicator to the value corresponding to an error. This may occur before the DMA block performs other DMA commands associated with the task, such as before the DMA block retrieves data from the host memory.

At block 215, the second stage performs other DMA commands in the list, such as host-facing DMA operations. These DMA commands can include, for example, incrementally retrieving data from host memory. For example, PDUs can range from 4K to 128K, or even larger sizes. As such, these DMA operations (and accompanying resource allocation) may be incremental, fetching a portion of application data each time from host memory. During these DMA commands, the error indicator may remain in the initialized state (i.e., indicating there was an error with the DMA commands even though an error may not yet have occurred).

At block 220, the DMA block determines whether an error was detected when performing the host-facing DMA operations. As mentioned above, these errors could include host driver bugs that program wrong entries in the NVMe PRP list, a function level reset that results input/output memory management unit (IOMMU) map entries programed for host pages becoming invalid, or a malicious host program obtaining kernel privileges and intentionally posting a WQE associated with wrong PRP list entry addresses.

If no error was detected by the second stage, the method 200 proceeds to block 225 where the DMA block of the second stage updates the error indicator in the task pointer to a value to indicate no error occurred. For example, the DMA block can perform a last DMA command to change the value of the error indicator bit or bits to indicate no error occurred when executing the list of DMA commands generated at block 205.

In contrast, if an error was detected, the method 200 skips block 225 and performs block 230 and transmits (or posts) the task pointer to the next pipeline without updating the value of the error indicator. In that case, when the next pipeline receives (or retrieves) the task pointer, the error indicator informs the second pipeline that the first pipeline detected a host-facing error. However, if block 225 was performed, then the error indicator informs the second pipeline that there was no error in the first pipeline.

In one embodiment, the task pointer (or WQE) is stored into memory in the NIC or DPU using a DMA command.

In one embodiment, the pipeline may process multiple task pointers (or multiple WQEs) in a ring. In any case, the task pointers can be processed independently. For example, one task pointer can have an error indicator bit indicating a DMA error while the other task pointers do not. When processing multiple task pointers in a ring, the error indicator bits for each of the task pointers can be initialized to zero. If the DMA commands are performed successfully, the pipeline toggles the error indicator bits and writes the task pointers in the ring. The downstream pipeline knows the error indicators are initialized to zero but then changes them to a value of one if there are no DMA errors. As such, the downstream pipeline knows there was an error if the error indicator bit for a task pointer still has a zero.

The actions of the second pipeline are discussed in more detail in FIG. 4 below.

Figure 3:
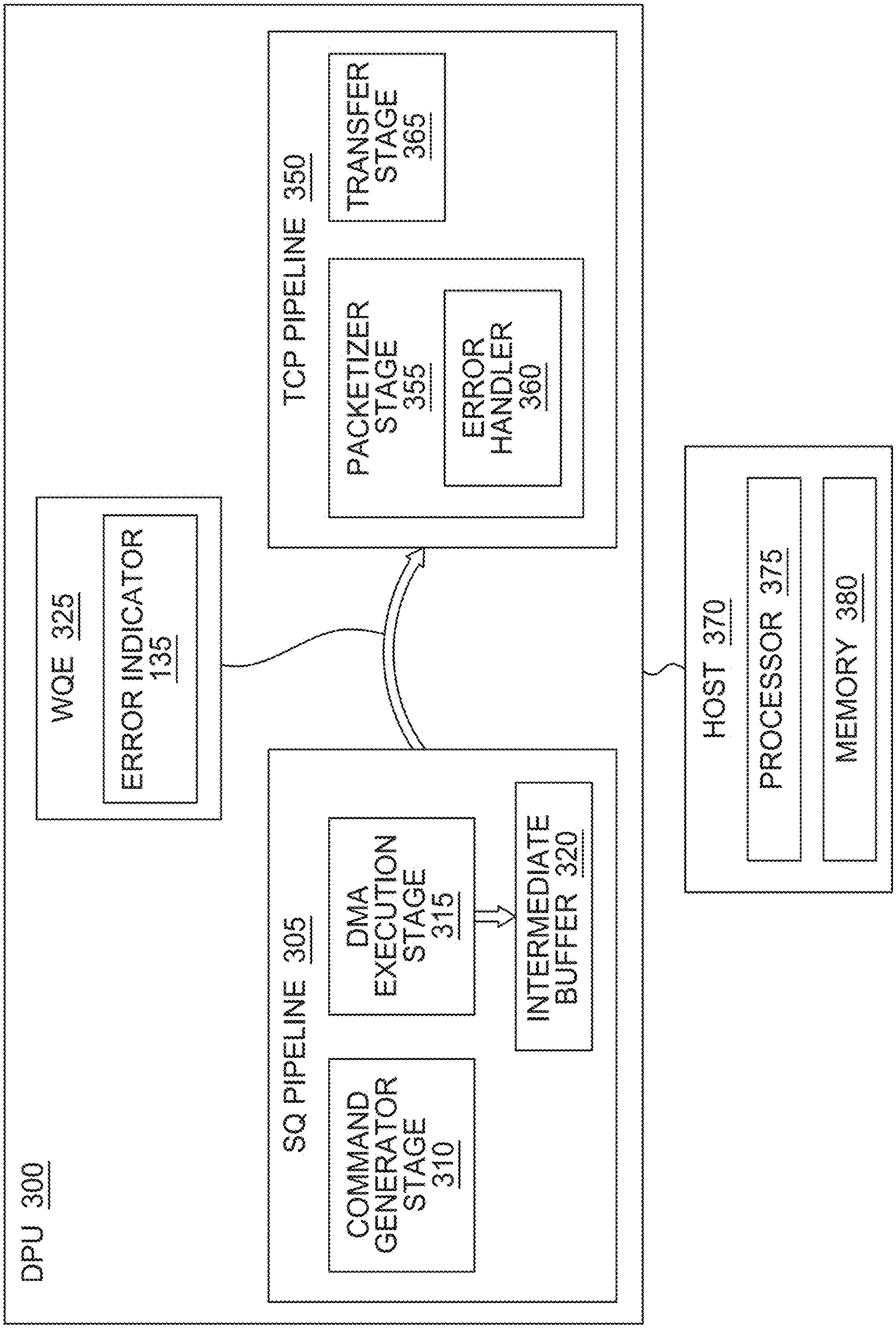
FIG. 3 illustrates a system with a DPU that performs host-facing DMA failure detection, according to one embodiment herein.

FIG. 3 illustrates a system with a DPU 300 that performs host-facing DMA failure detection, according to one embodiment herein. While a DPU 300 is shown, a NIC could also be used to perform the functions described herein. Thus, the embodiments herein are not limited to a particular system. Further, the DPU 300 (or NIC) could be implemented using a single integrated circuit (IC), or multiple ICs disposed on a common substrate (e.g., a silicon interposer or a printed circuit board) or in a stack.

The DPU 300 has at least two pipelines (or queues): a submission queue (SQ) pipeline 305 and a TCP pipeline 350. The SQ pipeline 305 includes a command generator stage 310 and a DMA execution stage 315. These stages can be different hardware circuits. These stages can also execute firmware to perform the operations described herein.

The command generator stage 310 can generate a list of DMA commands or instructions that are then performed by the DMA execution stage 315. For instance, the command generator stage 310 can generate a list of DMA commands that the DMA execution stage 315 executes to pull data from memory 380 of a host 370. For example, these DMA commands may retrieve data from the memory 380 (e.g., at intervals) that is then stored in an intermediate buffer 320 in the SQ pipeline 305.

In one embodiment, the intermediate buffer 320 resource constrains the SQ pipeline 305. For example, each task may be assigned space in the intermediate buffer 320 so that if a task fails (e.g., due to a DMA error), the space for that task is still allocated in the buffer which may mean the SQ pipeline 305 cannot accept another task. The embodiments herein permit the next pipeline in the process—i.e., the TCP pipeline 350 in this example—to free up the allocated memory in the intermediate buffer 320 when a DMA associated with a task fails. This may be faster than waiting on software (e.g., software executing in a processor 375 in the host 370) or some other process to perform error handling. In this manner, the hardware/firmware in the TCP pipeline 350 can identify an error and free up resources in the DPU 300 assigned to the task, thereby freeing those resources for new tasks.

The DMA execution stage 315 receives the list of DMA commands from the command generator stage 310 and attempts to execute those DMA commands, and store the fetched data in the intermediate buffer 320. As discussed above, one of the DMA commands may instruct the DMA execution stage 315 to set the error indicator 135 in a WQE 325 to an initial value indicating that an error had occurred when executing the list of commands (although an error may not yet have occurred at this point in time).

After executing the list of DMA commands, if the DMA execution stage 315 does not detect an error (e.g., a host-facing DMA error), the DMA execution stage 315 can update the error indicator 135 to a value that instead indicates that no DMA error was detected by the SQ pipeline 305. However, if the DMA execution stage 315 does detect an error when executing one of the DMA commands, the stage 315 may not change the initial value of the error indicator 135.

In any case, the DMA execution stage 315 transmits the WQE 325 to the TCP pipeline 350. In addition to the error indicator 135, the WQE 325 can include pointer information to the location of the retrieved data in the intermediate buffer 320. This retrieved data can be the data that was retrieved by the DMA execution stage 315 from the host memory 380. In general, the WQE 325 is a data structure that passes context of tasks from the SQ pipeline 305 to the TCP pipeline 350.

In one embodiment, the SQ pipeline 305 can use a doorbell or some other interrupt to inform the TCP pipeline 350 that the WQE 325 is ready. Because the pipelines can be scheduled at different times, the SQ pipeline 305 may prepare several WQEs 325 for several tasks before the TCP pipeline 350 is scheduled by the DPU 300 to begin processing the WQEs 325. That is, the pipelines 305 and 350 do not have to operate simultaneously.

If the TCP pipeline 350 determines, from evaluating the error indicator 135, that there was an error when the SQ pipeline 305 was performing the DMA commands, a packetizer stage 355 includes an error handler 360 (e.g., hardware, firmware, or a combination of both) that perform error handling. This error handling can include identifying memory allocated to the task in the intermediate buffer 320, and releasing this memory location(s) so additional tasks can be scheduled for the SQ pipeline 305. As mentioned above, by notifying the next queue—e.g., the TCP pipeline 350—using the error indicator, the hardware queue can perform error handling rather than waiting on software (e.g., software executing in the NIC or DPU, or software executing in the host) or firmware to perform error handling which can mean the resources can be freed up quicker thereby improving the ability of the DPU 300 to process additional tasks.

In one embodiment, the SQ pipeline 305 and the TCP pipeline 350 are part of a P4 architecture. In one embodiment, the DPU 300 is a fully programmable P4 DPU. In one embodiment, the pipelines in the DPU 300 are part of (or compatible with) the P4 Portable NIC Architecture (PNA). P4 is a domain-specific language for describing how packets are processed by a network data plane. A P4 program comprises an architecture, which describes the structure and capabilities of the pipeline, and a user program, which specifies the functionality of the programmable blocks within that pipeline.

Figure 4:
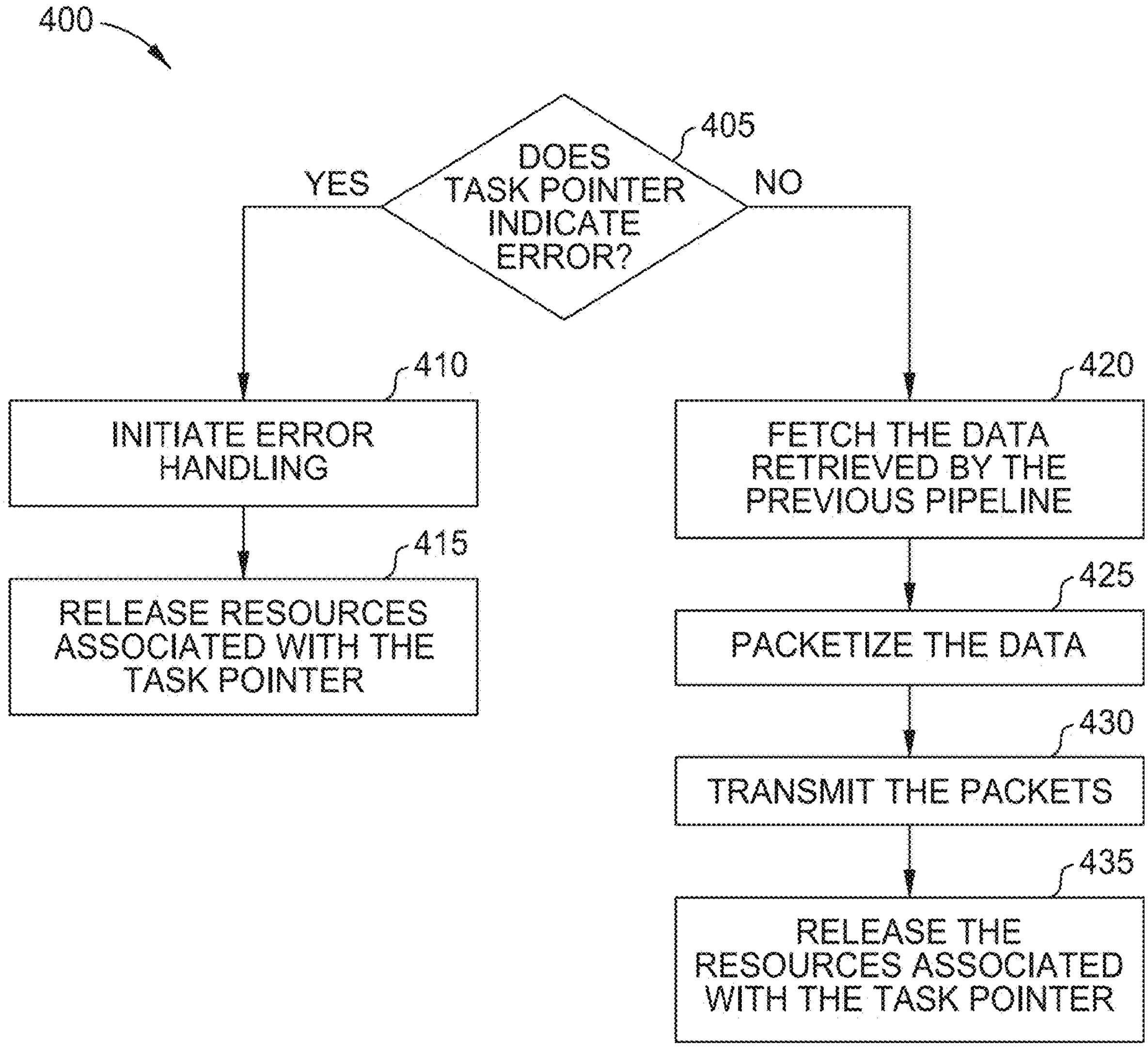
FIG. 4 is a flowchart for handling host-facing DMA failures, according to one embodiment herein.

FIG. 4 is a flowchart of a method 400 for handling host-facing DMA failures, according to one embodiment herein. In one embodiment, the method 400 begins after the completion of the method 200 in FIG. 2 after the downstream queue (e.g., the TCP pipeline 350) receives (or is notified of) the task pointer (e.g., a WQE).

At block 405, a first stage in the queue or pipeline determines whether the task pointer indicates there is an error. For example, the packetizer stage 355 in FIG. 3 may evaluate the value of the error indicator 135 to determine whether there was an error when the previous queue or pipeline was performing DMA operations (e.g., a host-facing DMA error).

If there was an error, the method 400 proceeds to block 410 where the pipeline initiates error handling. For example, the pipeline can include an error handler (e.g., the error handler 360 in FIG. 3) that has logic for performing error handling on behalf of the previous pipeline.

At block 415, the error handler releases resources associated with the task pointer. For instance, the error handler can release memory assigned to the task, such as memory locations in the intermediate buffer 320 in FIG. 3. In addition to releasing memory, the error handler can also inform the originator or requester of the task that it failed. The error handler can also remove the task pointer.

However, if the task pointer does not indicate there was an error in the previous pipeline, the method 400 instead proceeds to block 420 where the packetizer stage fetches the data retrieved by the previous pipeline. For example, the packetizer stage may retrieve the data corresponding to the task from the intermediate buffer 320 in FIG. 3.

At block 425, the packetizer stage packetizes the data. In one embodiment, the packetizer stage uses a packet header vector (PHV) to packetize the data. The PHV can contain headers and metadata along the TCP pipeline which are used to create the packet.

Once the data is formed into a TCP packet, at block 430 a next stage in the pipeline (e.g., the transfer stage 365 in FIG. 3) transmits the packet in the network. In another embodiment, a third pipeline may be used to transmit the packet.

At block 435, the pipeline releases the resources associated with the task pointer. In one embodiment, the transfer stage of the TCP pipeline may release the resource. However, in another embodiment, another stage in the TCP pipeline may release the resources and inform the requestor that the data was successfully packetized and sent. In this manner, FIGS. 2 and 4 detect the host-facing DMA error asynchronously in a multi-stage (or multi-pipeline) service queue architecture.

In one embodiment, the methods 200 and 400 in FIGS. 2 and 4 are used for performing NVMe over a network (e.g., a TCP network). For example, the SQ pipeline 305 in FIG. 3 can fetch application WQEs from host (as described in FIG. 2), while TCP pipeline 350 prepares NVMe data payload and posts to the TCP service queue for packetization and transfer service (e.g., blocks 405-425 in FIG. 4). A third pipeline can prepare and transfer the entire TCP or RDMA packet and release the resources that are used for serving a single application WQE (e.g., blocks 430 and 435 in FIG. 4). That is, during normal operation, the SQ pipeline allocates NIC resources for the application WQE, schedules DMA operations to download PRP list and application payload from host memory, prepares and DMAs WQE to the next stage service queue, and rings the doorbell to the TCP pipeline. Note that the queue process can schedule multiple DMA commands in a single process context. Upon waking up from the doorbell, the TCP pipeline obtains the WQE from the upstream queue, retrieves processing context from the WQE, processes it, and may release resources associated with the WQE depending on whether the specific task can be finished or not.

However, if an error is detected when performing DMA commands for the NVMe application, the SQ pipeline ensures the error indicator has a value indicating a DMA error. In that case, the TCP pipeline is informed of the DMA error and can instead perform error handling.

The embodiments herein have several non-limiting advantages such as only adding one additional DMA command, i.e., WQE error indicator DMA, hence the overhead is negligible. They provide a graceful way to handle host DMA error without resorting to synchronous DMA response feedback from an ASIC DMA engine. They also provide a solution to allow software to run more complicated error handling tasks, which includes releasing resources associated with application context encountering the error and generating asynchronous error notification to NIC firmware to further unwind the error recovery.

Figure 5:
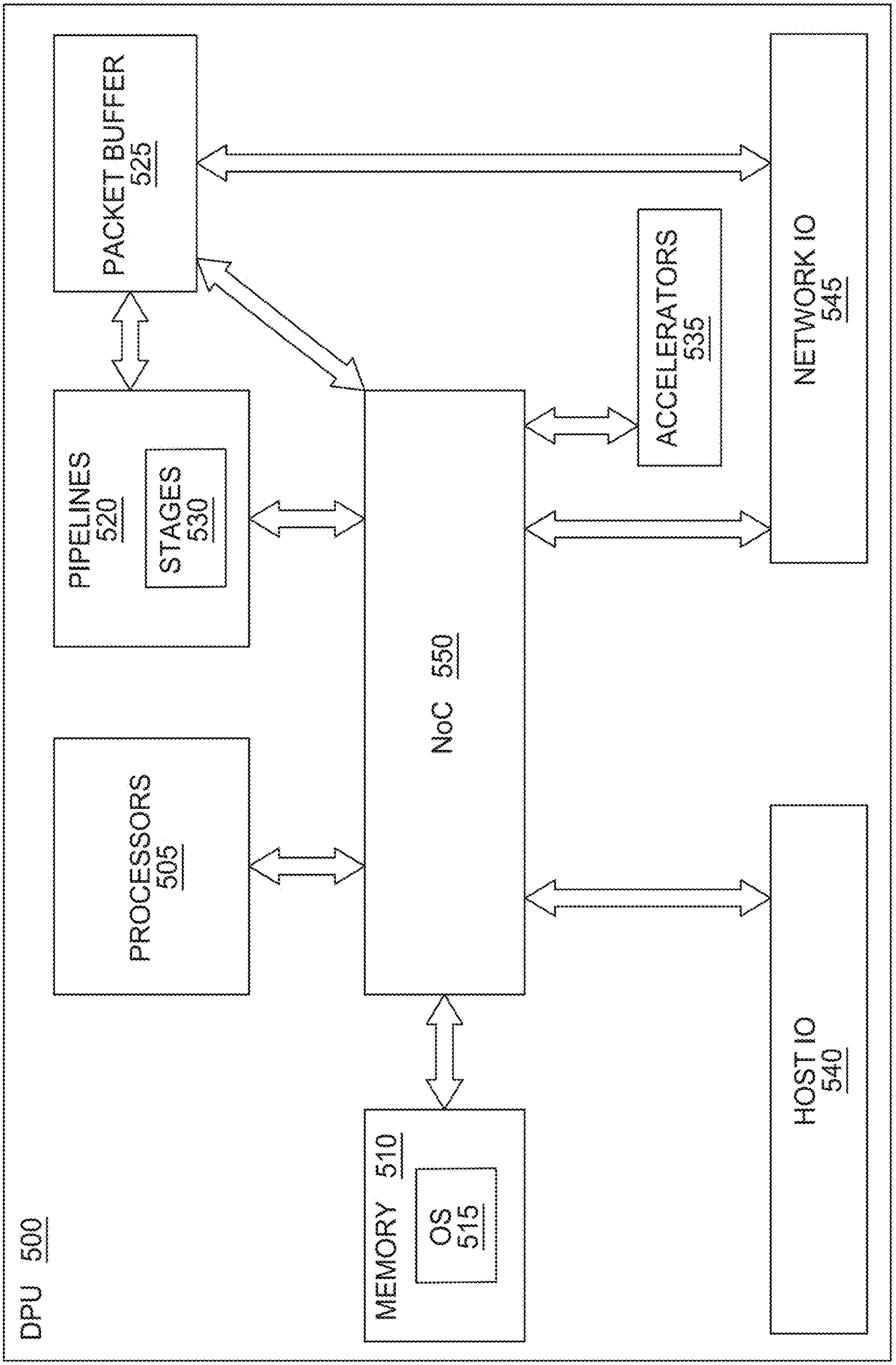
FIG. 5 illustrates an example data processing unit, according to one embodiment herein.

FIG. 5 illustrates an example data processing unit, according to one embodiment herein. The DPU 500 includes a plurality of processors 505. In one embodiment, the processors 505 include any number of processing cores. In one embodiment, the processors 505 may be CPUs. The processors 505 can form one or more CPU core complexes. The processors 505 can be any hardware circuitry that uses an instruction set architecture (ISA) to process data, such as a complex instruction set computer (CISC) or reduced instruction set computer (RISC).

The memory 510 can include volatile or non-volatile memory such as random access memory (RAM), high bandwidth memory (HBM), and the like. The memory 510 can include an operating system (OS) 515 that is separate from the host OS.

In one embodiment, the DPU may be in (or be used to implement) a network interface controller/card (NIC) such as a SmartNIC that processes packets before they are forwarded to a host (e.g., a host CPU or GPU). In one embodiment, the DPUs 500 are fully programmable P4

DPUs. The DPU 500 includes multiple pipelines 520 (which can be the same type or different types) for processing received network packets stored in a packet buffer 525 or for performing the tasks described in the Figures above. In this example, the pipelines 520 have direct connections to the packet buffer 525.

The pipelines 520 can operate in parallel. Further, the pipelines 520 can be the same type of pipeline (e.g., perform the same tasks). In other embodiments, the DPU 500 may have different types of pipelines 520. For example, the DPU 500 could include networking pipelines which perform networking tasks such as combining packets that were subdivided to be compatible with a maximum transmission unit (MTU) or for dealing with one or more host operating systems, drivers, and/or message descriptor formats in host memory, and could also include direct memory access (DMA) pipelines which perform memory reads and writes, such as the SQ pipeline 305 discussed in FIG. 3.

The pipelines 520 include multiple stages 530 where received packet data is processed at each stage 530 before being passed to the next stage. This packet data could be the entire packet or just a portion of the packet. For example, a parser in the DPU 500, which is upstream from the pipelines 520, may parse out a particular portion of a received packet (e.g., PHV) which is then sent to one of the pipelines 520.

The stages 530 can include circuitry or hardware. In one embodiment, the stages 530 can be programmed using a pipeline programming language, such as P4. In one example, the stages 530 in one pipeline 520 perform the same functions of the stages 530 in another pipeline 520. However, in other embodiments, the stages may perform different functions.

In addition to the stages, the pipelines 520 may each include memory, which can be referred to as local memory. This memory can store local tables that indicate how, or if, a particular packet should be processed at the stages 530. For example, one of the stages in the pipelines 520 can perform a lookup to read a policing entry in a table to determine whether an entity associated with the packet has exceeded a rate limit (e.g., a packet rate limit, a data rate limit, or both).

The DPU 500 can include accelerators 535 to perform specialized tasks associated with data movement. The accelerators 535 can include a cryptography accelerator, a data compression accelerator, as well as accelerators for performing regex or dedupe.

To communicate with the host and a network, the DPU 500 includes host input/output (IO) 540 and network IO 545. The host IO 540 can include a PCIe interface, or any suitable protocol for communicating with a CPU or GPU in the host. The network IO 545 can include Ethernet interfaces, and the like for communicating with a network.

The DPU 500 includes a network on chip (NoC) 550 for interconnecting the various components discussed above. While a NoC is disclosed, the DPU 500 can include any suitable on-chip network. While some components in the DPU 500 may rely on the NoC 550 to communicate with other components, the DPU 500 can also include connections between components that bypass the NoC 550. For example, the packet buffer 525 can have a connection to the network IO 545 that bypasses the NoC 550. Similarly, the pipelines 520 can exchange packet data with the packet buffer 525 without having to rely on the NoC 550. However, to transfer data to the processors 505, the pipelines 520 may use the NoC 550.

In one embodiment, the DPU 500 includes security and management features such as offering a hardware root of trust, secure boot, and the like.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A network device comprising:

a first pipeline comprising circuitry configured to:

generate a list of direct memory access (DMA) commands corresponding to a task, initialize, before performing the list of DMA commands, an error indicator in a task pointer to indicate that an error occurred when executing the list of DMA commands, and after executing the list of DMA commands by the first pipeline without detecting an error, update the error indicator to indicate there was no error corresponding to the list of DMA commands; and a second pipeline comprising circuitry configured to:

receive the task pointer, and packetize data retrieved by the first pipeline when executing the list of DMA commands.

2. The network device of claim 1, wherein the packetized data is part of a nonvolatile memory express (NVMe) over fabric application.

3. The network device of claim 1, wherein the list of DMA commands pulls data from host memory, wherein the task pointer points to a memory location in a local memory in a network interface card or controller (NIC) that stores the data after executing the list of DMA commands.

4. The network device of claim 3, wherein the task pointer is a work queue element (WQE).

5. The network device of claim 3, wherein the second pipeline is configured to, upon detecting that a DMA error did occur in the first pipeline based on the error indicator, perform error handling.

6. The network device of claim 5, wherein the error handling comprises the second pipeline releasing the memory location in the local memory that is assigned to the task.

7. The network device of claim 3, wherein the local memory comprises an intermediate buffer in the first pipeline.

8. The network device of claim 1, wherein the first and second pipelines are part of a P4 architecture.

9. The network device of claim 8, wherein the network device is a fully programmable P4 data processing unit.

10. A method, comprising:

generating, in a first pipeline, a list of direct memory access (DMA) commands;

initializing, before performing the list of DMA commands, an error indicator in a task pointer to indicate an error corresponding to the DMA commands;

after executing the DMA commands in the first pipeline without detecting an error, updating the error indicator to indicate there was no error corresponding to the DMA commands; and transmitting the task pointer to a second pipeline.

11. The method of claim 10, further comprising:

determining, at the second pipeline, that the task pointer indicates the first pipeline did not detect an error when executing the list of DMA commands; and retrieving, by the second pipeline, data pulled by the first pipeline when executing the list of DMA commands.

12. The method of claim 11, further comprising packetizing the data in the second pipeline.

13. The method of claim 12, wherein the packetized data is part of a nonvolatile memory express (NVMe) over fabric application.

14. The method of claim 10, wherein the list of DMA commands pulls data from host memory, wherein the task pointer points to a memory location in a local memory in a network interface card or controller (NIC) that stores the data after executing the list of DMA commands.

15. The method of claim 14, further comprising:

generating, in the first pipeline, a second list of DMA commands for a second task;

initializing, before performing the second list of DMA commands, an error indicator in a second task pointer to indicate an error corresponding to the second list of DMA commands;

after executing the second list of DMA commands in the first pipeline and detecting an error, transmitting the second task pointer to the second pipeline; and after detecting that an error occurred in the first pipeline when executing the second list of DMA commands, performing error handling in the second pipeline, wherein the error handling comprises the second pipeline releasing a memory location in the local memory that is assigned to the second task.

16. A NIC comprising:

a first queue comprising circuitry configured to:

generate a list of DMA commands corresponding to a task, initialize, before performing the list of DMA commands, an error indicator in a task pointer to indicate that an error occurred when executing the list of DMA commands, and after executing the list of DMA commands by the first queue without detecting an error, update the error indicator to indicate there was no error corresponding to the list of DMA commands; and a second queue comprising circuitry configured to:

receive the task pointer, and packetize data retrieved by the first queue when executing the list of DMA commands.

17. The NIC of claim 16, wherein the list of DMA commands pulls data from host memory, wherein the task pointer points to a memory location in a local memory in a network interface card or controller (NIC) that stores the data after executing the list of DMA commands.

18. The NIC of claim 17, wherein the second queue is configured to, upon detecting that a DMA error did occur in the first queue based on the error indicator, perform error handling.

19. The NIC of claim 18, wherein the error handling comprises the second queue releasing the memory location in the local memory that is assigned to the task.

20. The NIC of claim 16, wherein the packetized data is part of a NVMe over fabric application.

* * * * *